US012677804B2

(12) United States Patent
Wei et al.

(10) Patent No.: US 12,677,804 B2
(45) Date of Patent: Jul. 14, 2026

(54) PET TRACTOR AND TRACTION DEVICE

(71) Applicant: Shenzhen Petsuper Smart Technology Co., Ltd., Shenzhen (CN)

(72) Inventors: Jingli Wei, Shenzhen (CN); Kaiyang Hu, Shenzhen (CN)

(73) Assignee: Shenzhen Petsuper Smart Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/919,476

(22) Filed: Oct. 18, 2024

(65) Prior Publication Data

US 2026/0041063 A1 Feb. 12, 2026

(30) Foreign Application Priority Data

Aug. 8, 2024 (CN) .......................... 202411087623.7

(51) Int. Cl.
*A01K 27/00* (2006.01)

(52) U.S. Cl.
CPC .................................. *A01K 27/004* (2013.01)

(58) Field of Classification Search
CPC ..................................................... A01K 27/004
USPC ........................................................ 242/396.4
See application file for complete search history.

(56) References Cited

U.S. PATENT DOCUMENTS

| | | | | | |
|---|---|---|---|---|---|
| 4,202,510 | A | * | 5/1980 | Stanish | A01K 27/004 |
| | | | | | 242/384.7 |
| 8,826,864 | B2 | * | 9/2014 | Tang | B65H 75/4434 |
| | | | | | 119/795 |
| 9,943,071 | B2 | * | 4/2018 | Hill | B65H 75/4426 |
| 10,893,660 | B2 | * | 1/2021 | Hill | B65H 75/4428 |
| 2007/0022975 | A1 | * | 2/2007 | Arnold | A01K 27/004 |
| | | | | | 119/796 |
| 2016/0081306 | A1 | * | 3/2016 | Fikfak | B65H 75/4447 |
| | | | | | 119/796 |
| 2018/0317456 | A1 | * | 11/2018 | Bogdahn | B65H 75/4418 |
| 2021/0037791 | A1 | * | 2/2021 | Park | A01K 27/004 |
| 2022/0240489 | A1 | * | 8/2022 | Li | A01K 27/004 |

(Continued)

FOREIGN PATENT DOCUMENTS

| | | |
|---|---|---|
| CN | 206940133 U | 1/2018 |
| CN | 214998969 U | 12/2021 |
| CN | 109496894 B | 3/2024 |

OTHER PUBLICATIONS

The European search report of Counterpart European Patent Application No. 24206921.9 issued on Apr. 8, 2025.

(Continued)

*Primary Examiner* — Christopher D Hutchens
*Assistant Examiner* — Nevena Aleksic

(57) ABSTRACT

The present disclosure provides a pet tractor and a traction device. The pet tractor includes a housing, a rope winding assembly, a locking assembly, and a blocking assembly, wherein the housing defines a mounting cavity, and the mounting cavity is provided therein with a first rotation shaft; the rope winding member is rotationally connected to the first rotation shaft, and one end of the movable member is movably connected to the rope winding member; the locking assembly is connected to the housing, and the locking assembly is movably connected to one end of the tractor rope; and the blocking assembly can abut against or separate from one end of the movable member.

8 Claims, 5 Drawing Sheets

(56) References Cited

U.S. PATENT DOCUMENTS

2022/0273972 A1 * 9/2022 Hung ........................ A62B 1/10
2023/0200356 A1 * 6/2023 Chen .................... B65H 75/406
119/796

OTHER PUBLICATIONS

Communication pursuant to Article 94(3) EPC of Counterpart European Patent Application No. 24206921.9 issued on Apr. 22, 2025.
Communication pursuant to Article 94(3) EPC of Counterpart European Patent Application No. 24206921.9 issued on Mar. 3, 2026.

* cited by examiner

PET TRACTOR AND TRACTION DEVICE

CROSS-REFERENCE TO RELATED APPLICATIONS

The present disclosure claims the priority to the Chinese patent application with the filling No. 2024110876237 filed with the Chinese Patent Office on Aug. 8, 2024, and entitled "PET TRACTOR AND TRACTION DEVICE", the contents of which are incorporated herein by reference in entirety.

TECHNICAL FIELD

The present disclosure relates to the technical field of pet traction, and specifically to a pet tractor and a traction device.

BACKGROUND ART

With the development of society and economy, people will choose pets to accompany them in their life, and it is very necessary to use tractor when taking the pets out. The tractor can help the owner to control action ranges of the pet to prevent the pet from getting lost, and can avoid the pet suddenly rushing to pedestrian, vehicle, or other animals, so as to reduce the occurrence of accidental injuries. However, the pet traction devices in the market have a problem of poorer control for the pets, which is inconvenient in use.

SUMMARY

An object of the present disclosure is to provide a pet tractor and a traction device to reduce the possibility that the pet rushes out and hurts people, thereby improving the control and restriction ability for pets when taking them out.

A first aspect of the present disclosure provides a pet tractor, wherein the pet tractor includes a housing, a rope winding assembly, a locking assembly, and a blocking assembly, wherein the housing defines a mounting cavity, and the mounting cavity is provided therein with a first rotation shaft;

the rope winding assembly includes at least one movable member, a rope winding member, and a tractor rope winding on the rope winding member, wherein the rope winding member is rotationally connected to the first rotation shaft, and one end of the movable member is movably connected to the rope winding member;

the locking assembly is connected to the housing, and the locking assembly is movably connected to one end of the tractor rope away from the rope winding member; and the blocking assembly can abut against or separate from one end of the movable member away from the rope winding member.

In one possible embodiment of the present disclosure, the rope winding member is a rope winding disc of an annular structure; two movable members are located on an inner periphery of the rope winding disc; and two movable members are provided, wherein the blocking assembly is sleeved on the first rotation shaft, and the blocking part is arranged on opposite two ends of the blocking assembly, wherein each movable member abuts against or separates from one blocking part.

In one possible embodiment of the present disclosure, two movable members are symmetrically arranged, and the first rotation shaft is on a line connecting two movable members.

In one possible embodiment of the present disclosure, the rope winding member is a rope winding disc of the annular structure, wherein a plurality of movable members are provided, and the plurality of movable members are arranged around the inner periphery of the rope winding disc, wherein the blocking assembly includes a plurality of blocking blocks, and the plurality of blocking blocks are all arranged on the housing, wherein each movable member abuts against or separates from one blocking block.

In one possible embodiment of the present disclosure, the movable member includes an anti-rushing plate and a first returning member, wherein one end of the anti-rushing plate is movably connected to the rope winding member by a second rotation shaft; and the first returning member is sleeved on the second rotation shaft and one side of the first returning member is connected to the anti-rushing plate, wherein one side of the first returning member away from the anti-rushing plate is connected to the rope winding member, and one end of the anti-rushing plate away from the second rotation shaft abuts against or separates from the blocking assembly.

In one possible embodiment of the present disclosure, a plurality of position limitation parts are arranged around an outer periphery of the rope winding member, and one end of the locking assembly can abut against or separate from any one of the position limitation parts.

In one possible embodiment of the present disclosure, the rope winding assembly further includes a second returning member, wherein the second returning member is sleeved on the first rotation shaft; one side of the second returning member is connected to the housing; and one side of the second returning member away from the housing is hinged to the rope winding member.

In one possible embodiment of the present disclosure, the housing is provided with a first opening, so that one end of the tractor rope extends to an outside via the first opening.

In one possible embodiment of the present disclosure, a second opening is arranged on a position of the housing close to the locking assembly, and the second opening is communicated with the mounting cavity, wherein the locking assembly is located in the second opening, and the locking assembly is movably connected to the rope winding member.

A second aspect of the present disclosure provides a pet traction device, including the pet tractor described in any one of the above embodiments.

Compared to the prior art, the present disclosure includes the following beneficial effects. The present disclosure provides a pet traction device, wherein the rope winding member can rotate around the first rotation shaft, so that the tractor rope winding on the rope winding member can be extended, and a length of the tractor rope can be defined through the locking assembly locking the rope winding member. In case that the pet rushes out suddenly, when the rotation speed of the rope winding member exceeds a preset rotation speed, a rotation centrifugal force of the rope winding member is too large, so that the movable member can limit the rope winding member by means of abutting against the blocking assembly, so as to block and limit the rope winding member, which reduces the possibility that the pet rushes out and hurts people, thereby improving the control and restriction ability for pets when taking them out.

BRIEF DESCRIPTION OF DRAWINGS

In order to more clearly illustrate the technical solutions in the embodiments of the present disclosure, the drawings to be used in the embodiments will be briefly introduced below. It should be understood that the following drawings only show certain embodiments of the present disclosure, and therefore should not be regarded as a limitation of the scope. For a person of ordinary skill in the art, other relevant drawings can be obtained according to these drawings without inventive efforts.

Figure 1:
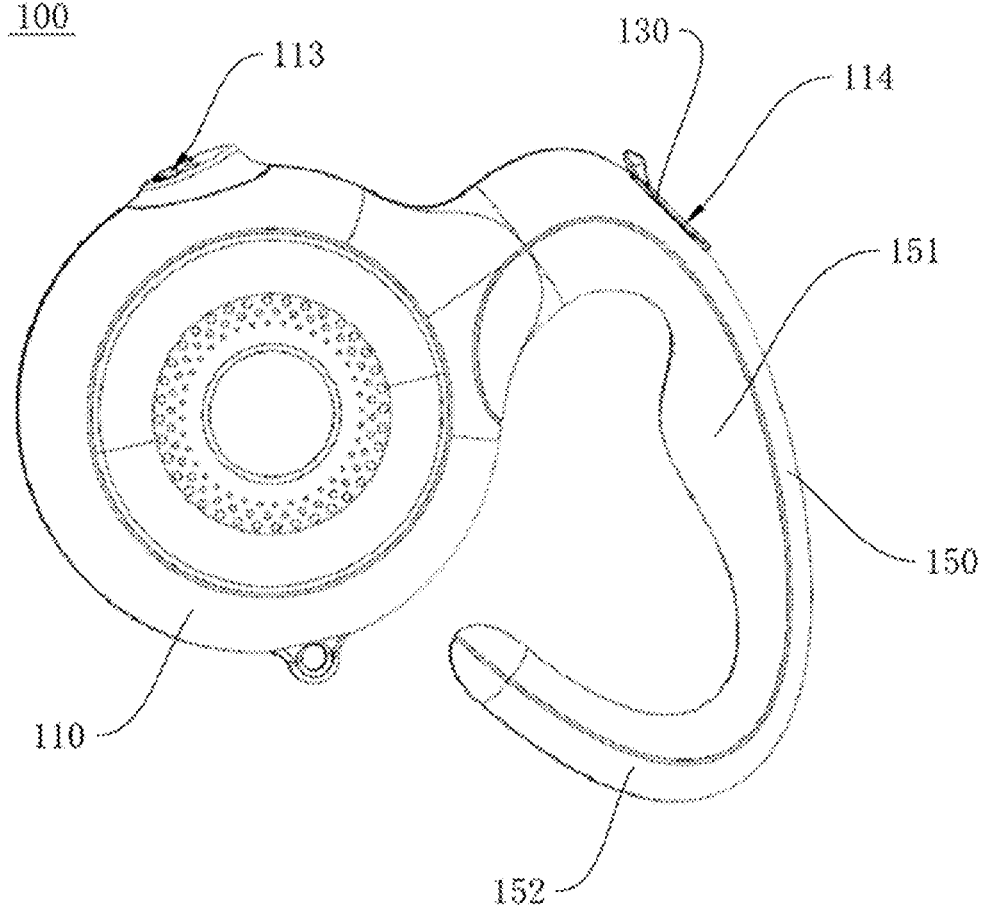
Figure 2:
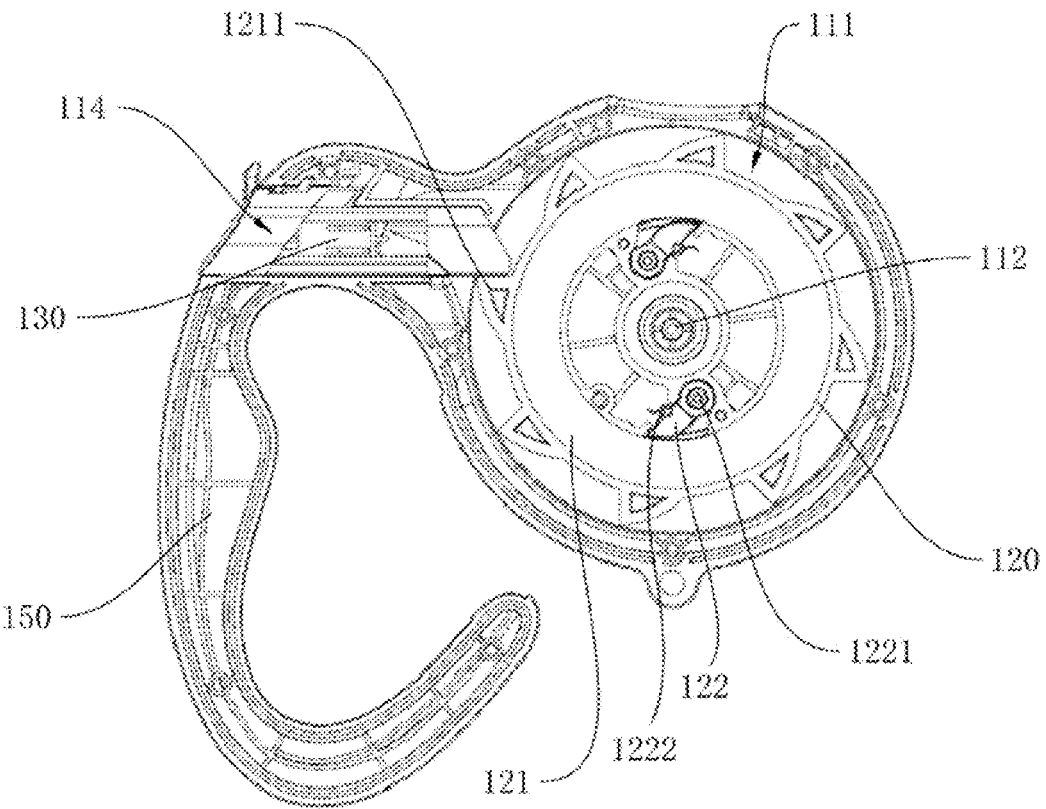
Figure 3:
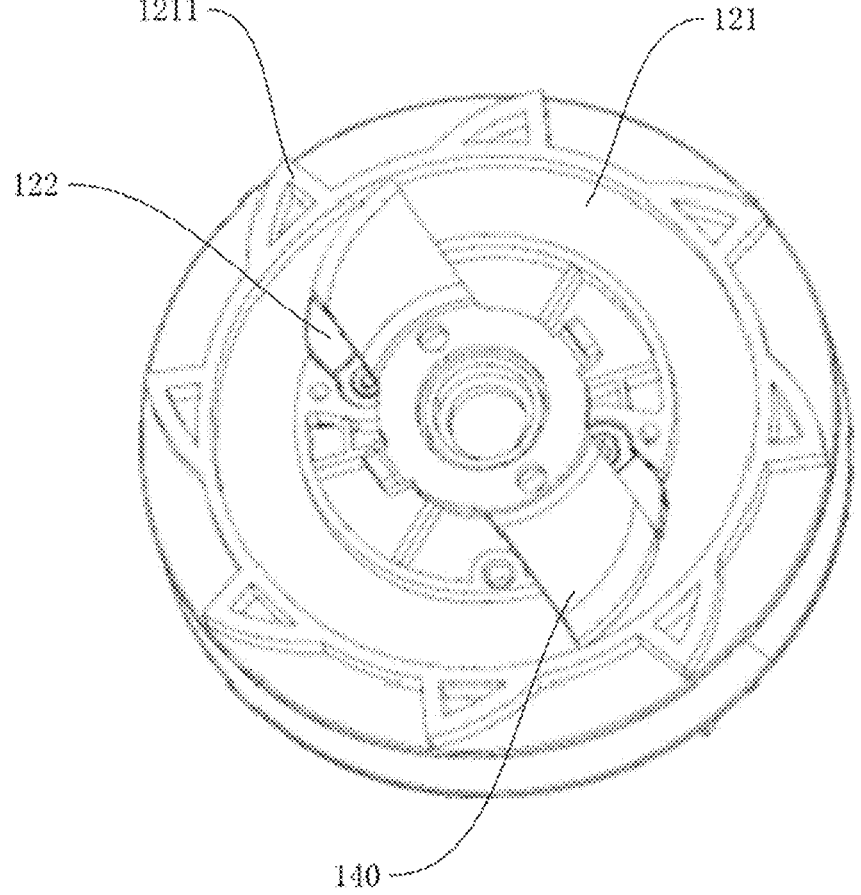
Figure 4:
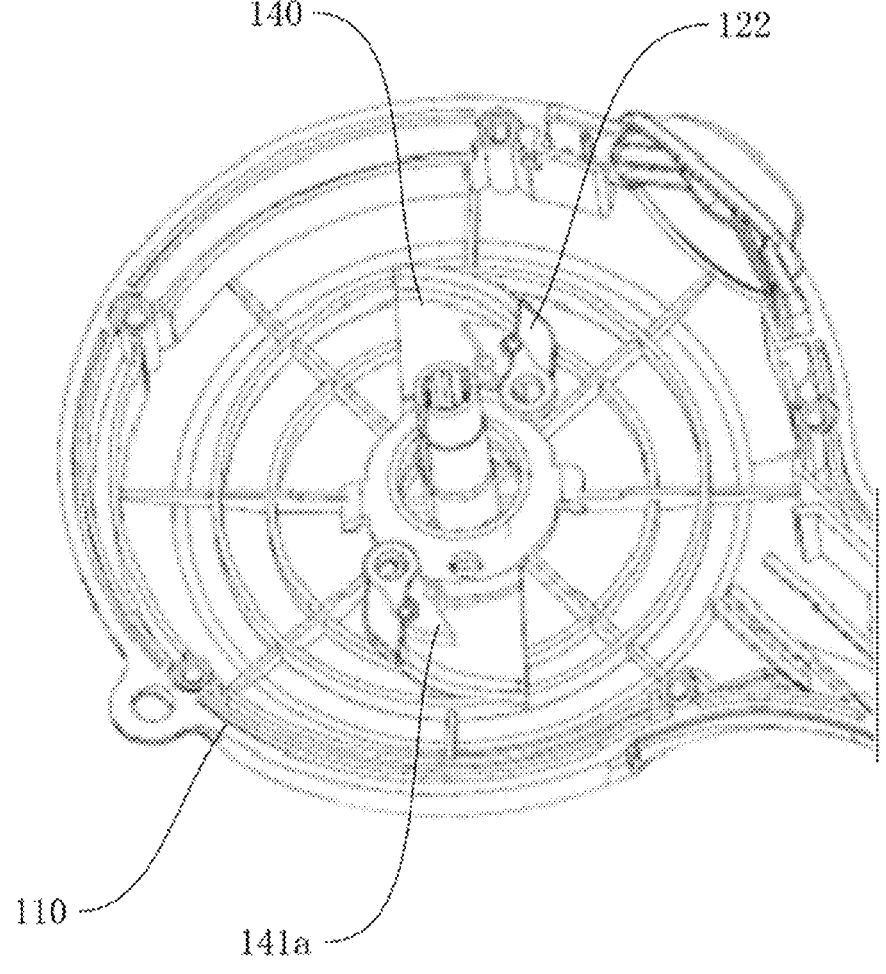
Figure 5:
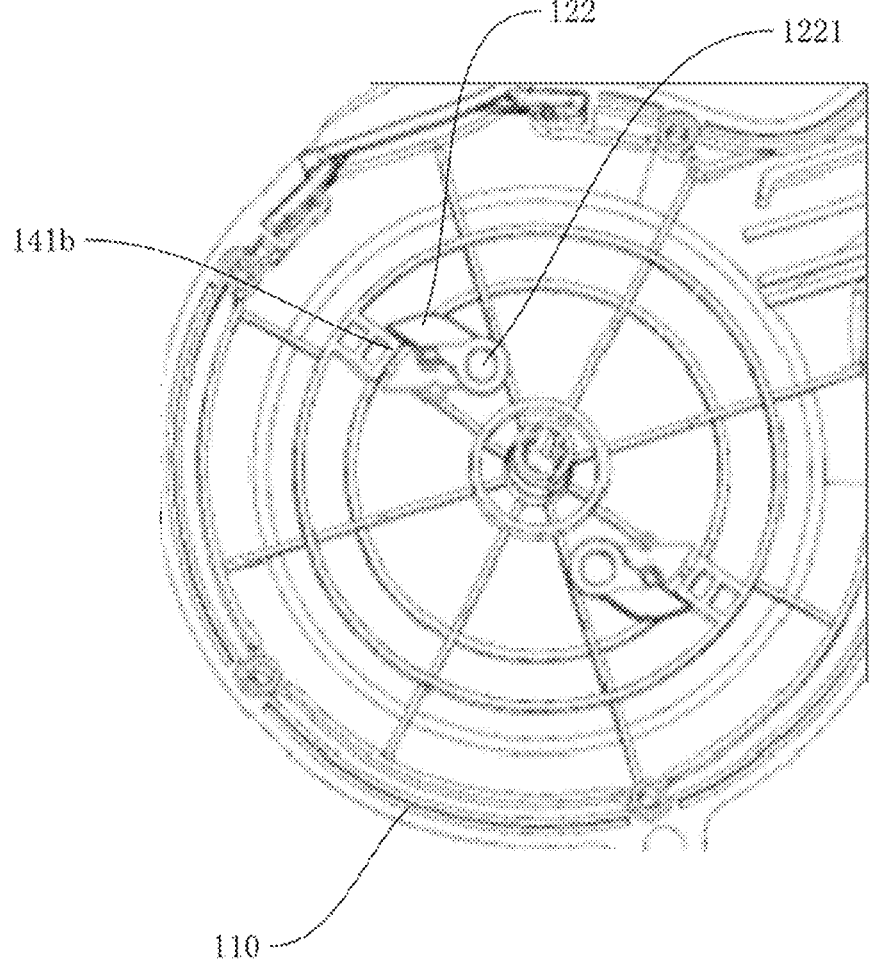

FIG. 1 shows a structure schematic diagram of a pet traction device provided in some embodiments of the present disclosure;

FIG. 2 shows a sectional structure schematic diagram of a pet traction device provided in some embodiments of the present disclosure;

FIG. 3 shows a structure schematic diagram of a rope winding assembly of a pet traction device provided in some embodiments of the present disclosure;

FIG. 4 shows a structure schematic diagram of a blocking assembly of a pet traction device provided in some embodiments of the present disclosure; and FIG. 5 shows the other structure schematic diagram of a blocking assembly of a pet traction device provided in some embodiments of the present disclosure.

MAIN REFERENCE NUMBERS

100—pet traction device; 110—housing; 111—mounting cavity; 112—first rotation shaft; 113—first opening; 114—second opening; 120—rope winding assembly; 121—rope winding member; 1211—position limitation part; 122—movable member; 1221—second rotation shaft; 130—locking assembly; 140—blocking assembly; 141*a*—blocking part; 141*b*—blocking block; 150—handle member; 151—gripping part; and 152—fixing part.

DETAILED DESCRIPTION OF EMBODIMENTS

In order to make the purpose, technical solutions, and advantages of the embodiments of the present disclosure clearer, the technical solutions in the embodiments of the present disclosure will be described clearly and completely as follows in conjunction with drawings in the embodiments of the present disclosure. It is clear that the embodiments described are partial embodiments of the present disclosure, and not all of the embodiments. The assembly in embodiments of the present disclosure generally described and shown in the drawings herein may be arranged and designed in various different configurations.

Therefore, the following detailed description of the embodiments of the present disclosure provided in the drawings is not intended to limit the scope of the present disclosure for which protection is claimed, but only represents selected embodiments of the present disclosure. Based on the embodiments in the present disclosure, all other embodiments obtained by a person of ordinary skill in the art without inventive efforts shall fall within the scope of protection of the present disclosure.

It should be noted that similar symbols and letters denote similar items in the following drawings. Therefore, once an item has been defined in one of the drawings, it does not need to be further defined and explained in subsequent drawings.

In the description of the present disclosure, it should be noted that orientations or positional relationships indicated by terms, such as "center", "up", "down", "left", "right", "vertical", "horizontal", "inside", and "outside", etc., are the orientations or positional relationships based on the drawings, or the orientation or positional relationship that the product of the present disclosure is customarily placed in use, which are only to facilitate the description of the present disclosure and simplify the description, and are not to indicate or imply that the device or element referred to must have a particular orientation, or be constructed and operated with a particular orientation, and therefore cannot to be understood as limitations of the present disclosure. Additionally, the terms "first", "second", and "third", etc., are used only to distinguish descriptions, and are not to be understood as indicating or implying a relative importance.

Additionally, the terms "horizontal", "vertical", and "overhanging", etc., do not mean that the component must be absolutely horizontal or overhanging, but can be slightly inclined, e.g., "horizontal" only refers that it is more horizontal than "vertical" and does not mean that the structure must be absolutely horizontal, but can be slightly inclined.

In the description of the present disclosure, it should also be noted that unless other expressly specifications and limitations, the terms "arrange", "mount", "connect", and "link" are to be understood in a broad sense, e.g. it can be a fixed connection, a detachable connection, or an integral connection; it can be a mechanical connection or an electrical connection; and it can be a direct connection, an indirect connection through an intermediate medium, or a communication inside two components. For a person of ordinary skill in the art, the specific meaning of the above terms in the present disclosure may be understood in specific situations.

Some embodiments of the present disclosure will be described in detail below in conjunction with the drawings. The following embodiments and features in the embodiments may be combined with each other without conflict.

Embodiment 1

Referring to FIG. 1, the embodiment of the present disclosure provides a pet tractor, wherein the pet tractor includes a housing 110, a rope winding assembly 120, a locking assembly 130, and a blocking assembly 140.

Specifically, in conjunction with FIG. 2 and FIG. 3, the housing 110 defines a mounting cavity 111, and the mounting cavity 111 is provided therein with a first rotation shaft 112; the rope winding assembly 120 includes at least one movable member 122, a rope winding member 121, and a tractor rope winding on the rope winding member 121, wherein the rope winding member 121 is rotationally connected to the first rotation shaft 112, and one end of the movable member 122 is movably connected to the rope winding member 121; the locking assembly 130 is connected to the housing 110, and the locking assembly 130 is movably connected to one end of the tractor rope away from the rope winding member 121; and the blocking assembly 140 can abut against or separate from one end of the movable member 122 away from the rope winding member 121. The rope winding member 121 can rotate around the first rotation shaft 112, so that the tractor rope winding on the rope winding member 121 can be extended, and a length of the tractor rope can be defined through the locking assembly 130 locking the rope winding member 121. In case that the pet rushes out suddenly, when the rotation speed of the rope winding member 121 exceeds a preset rotation speed, a rotation centrifugal force of the rope winding member 121 is too large, so that the movable member 122 can limit the rope winding member 121 by means of abutting against the blocking assembly 140, so as to block and limit the rope winding member 121, which reduces the possibility that the pet rushes out and hurts people.

In one embodiment, optionally, as shown in FIG. 2, the rope winding member 121 is a rope winding disc of an annular structure, and the rope winding disc is in shape of circular disc, wherein two movable members 122 are located on an inner periphery of the rope winding disc, and two movable members 122 are provided, wherein the blocking assembly 140 is sleeved on the first rotation shaft 112, and the blocking parts 141*a* are arranged on opposite two ends of the blocking assembly 140, wherein each movable member 122 abuts against or separates from one of the blocking parts 141*a*. The movable member 122 cooperates with the blocking part 141*a*, so that the rope winding disc can stop rotating when realizing the position limitation. Therefore, in case that the pet rushes out suddenly, the length of the tractor rope is stopped extending by the rope winding disc, so as to control the movement range of the pet.

Further, two movable members 122 are symmetrically arranged, and the first rotation shaft 112 is on a line connecting two movable members 122. Accordingly, any one of the movable members 122 can lock and limit the inner periphery of the rope winding disc of the annular structure. The two movable members 122 are centrally symmetrically arranged, so that it can play a better position limitation effect when two movable members 122 cooperate with the blocking part 141*a* of the blocking assembly 140 to limit positions, so as to control the rope winding disc to stop rotating, and thus control the length of the tractor rope, which reduces the influence when the pet rushes out and makes the pet in a controlled state.

In one embodiment, optionally, as shown in FIG. 2, a plurality of position limitation parts 1211 are arranged around an outer periphery of the rope winding member 121, and one end of the locking assembly 130 can abut against or separate from any one of the position limitation parts 1211. The tractor rope is wound or extended by the rope winding member 121 during the rotation process, i.e., the rope winding disc is locked and limited when any one of the position limitation parts 1211 abuts against one end of the locking assembly 130, so as to keep the length of the tractor rope unchanged. During the rotation process of the rope winding disc, the rope winding discs at different angles can all be locked and limited by the plurality of position limitation parts 1211, so as to reduce the possibility of locking dead angles at the range of 360° of the rope winding discs.

In one embodiment, optionally, as shown in FIG. 4 and FIG. 5, the rope winding assembly 120 further includes a second returning member, wherein the second returning member is sleeved on the first rotation shaft 112; one side of the second returning member is connected to the housing 110; and one side of the second returning member away from the housing 110 is hinged to the rope winding member 121. When the locking is canceled by the locking assembly 130, the rope winding member 121 resets to the initial state under the action of the second returning member, so that the rope winding member 121 drives the tractor rope to rotate in a reverse direction to retract the tractor rope, which is beneficial to adjust the length of the tractor rope and is convenient for the storage of the tractor rope, so that the movement range of the pet can be controlled by adjusting the length of the tractor rope by the user according to actual situations.

In summary, the rope winding member 121 of the pet tractor can rotate around the first rotation shaft 112, so that the tractor rope winding on the rope winding member 121 can be extended, and the length of the tractor rope can be defined through the locking assembly 130 locking the rope winding member 121. In case that the pet rushes out suddenly, when the rotation speed of the rope winding member 121 exceeds the preset rotation speed, the rotation centrifugal force of the rope winding member 121 is too large, so that the movable member 122 can limit the rope winding member 121 by means of abutting against the blocking assembly 140, so as to block and limit the rope winding member 121, which reduces the possibility that the pet rushes out and hurts people, thereby improving the control and restriction ability for pets when taking them out.

Embodiment 2

Referring to FIG. 1, the embodiment of the present disclosure provides another pet tractor including the housing 110, a rope winding assembly 120, a locking assembly 130, and a blocking assembly 140.

Specifically, in conjunction with FIG. 2 and FIG. 3, the housing 110 defines the mounting cavity 111, and the mounting cavity 111 is provided therein with the first rotation shaft 112. The rope winding assembly 120 includes at least one movable member 122, the rope winding member 121, and the tractor rope winding on the rope winding member 121, wherein the rope winding member 121 is rotationally connected to the first rotation shaft 112, and one end of the movable member 122 is movably connected to the rope winding member 121; and the rope winding member 121 can rotate around the first rotation shaft 112, so that the tractor rope winding on the rope winding member 121 can be extended.

In the embodiment, the locking assembly 130 is connected to the housing 110, and the locking assembly 130 is movably connected to one end of the tractor rope away from the rope winding member 121. The blocking assembly 140 can abut against or separate from one end of the movable member 122 away from the rope winding member 121, and the length of the tractor rope can be defined through the locking assembly 130 locking the rope winding member 121. In case that the pet rushes out suddenly, when the rotation speed of the rope winding member 121 exceeds the preset rotation speed, the rotation centrifugal force of the rope winding member 121 is too large, so that the movable member 122 can limit the rope winding member 121 by means of abutting against the blocking assembly 140, which blocks and limits the rope winding member 121, so as to reduce the possibility that the pet rushes out and hurts people.

In one embodiment, optionally, the rope winding member 121 is a rope winding disc of the annular structure, wherein a plurality of movable members 122 are provided, and the plurality of movable members 122 are arranged around the inner periphery of the rope winding disc; and the blocking assembly 140 includes a plurality of blocking blocks 141*b*, and the plurality of blocking blocks 141*b* are all arranged on the housing 110, wherein each movable member 122 abuts against or separates from one of the blocking blocks 141*b*, and any one of the movable members 122 cooperates with the blocking block 141*b*, so that the rope winding disc can stop rotating when realizing the position limitation. Therefore, in case that the pet rushes out suddenly, the length of the tractor rope is stopped extending by the rope winding disc, so as to control the movement range of the pet.

Further, the movable member 122 includes an anti-rushing plate and a first returning member, wherein one end of the anti-rushing plate is movably connected to the rope winding member 121 by the second rotation shaft 1221; and the first returning member is sleeved on the second rotation shaft 1221 and one side of the first returning member is connected to the anti-rushing plate, wherein one side of the first returning member away from the anti-rushing plate is connected to the rope winding member 121, and one end of the anti-rushing plate away from the second rotation shaft 1221 abuts against or separates from the blocking assembly 140. The first returning member can be a return spring or a reset spring, and the first returning member can also be a torsion spring.

In one embodiment, optionally, as shown in FIG. 2, the plurality of position limitation parts 1211 are arranged around the outer periphery of the rope winding member 121, and one end of the locking assembly 130 can abut against or separate from any one of the position limitation parts 1211. The tractor rope is wound or extended by the rope winding member 121 during the rotation process, i.e., the rope winding disc is locked and limited when any one of the position limitation parts 1211 abuts against one end of the locking assembly 130, so as to keep the length of the tractor rope unchanged. During the rotation process of the rope winding disc, the rope winding discs at different angles can all be locked and limited by the plurality of position limitation parts 1211, so as to reduce the possibility of locking dead angles at the range of 360° of the rope winding discs. Exemplarily, the rope winding discs with the plurality of position limitation parts 1211 are in sawtooth shapes, and the locking assembly 130 can limit the position limitation part 1211 when the rope winding disc rotates in a forward direction to extend the tractor rope or rotates in a reverse direction to rewind the tractor rope.

In one embodiment, optionally, as shown in FIG. 4 and FIG. 5, the rope winding assembly 120 further includes the second returning member, wherein the second returning member is sleeved on the first rotation shaft 112; one side of the second returning member is connected to the housing 110; and one side of the second returning member away from the housing 110 is hinged to the rope winding member 121. When the locking is canceled by the locking assembly 130, the rope winding member 121 resets to the initial state under the action of the second returning member, so that the rope winding member 121 drives the tractor rope to rotate in the reverse direction to retract the tractor rope, which is beneficial to adjust the length of the tractor rope and is convenient for the storage of the tractor rope, wherein the movement range of the pet can be controlled by the user according to the length of the tractor rope in actual situations. Exemplarily, the second returning member can be a return spring or a reset spring, and the second returning member can also be a torsion spring.

In one embodiment, optionally, referring to FIG. 1, the housing 110 is provided with the first opening 113, so that one end of the tractor rope extends to the outside via the first opening 113, wherein the tractor rope can be used to drag the pet by extending out of the first opening 113.

Optionally, as shown in FIG. 1, a second opening 114 is arranged on a position of the housing 110 close to the locking assembly 130, and the second opening 114 is communicated with the mounting cavity 111; and the locking assembly 130 is located in the second opening 114, and the locking assembly 130 is movably connected to the rope winding member 121, wherein the locking assembly 130 is arranged in the second opening 114, and the locking assembly 130 can extend and retract relative to the side wall of the second opening 114, so that the locking assembly 130 abuts against the rope winding member 121 and limits the rope winding member 121.

In one embodiment, optionally, in conjunction with FIG. 1 and FIG. 2, a handle member 150 is arranged at a position of the housing 110 close to the locking assembly 130, and the handle member 150 includes a gripping part 151 and a fixing part 152, wherein the gripping part 151 is arranged between the fixing part 152 and the locking assembly 130, and the user can grip the pet tractor by the gripping part 151. The fixing part 152 and the gripping part 151 cooperate to enlarge the gripping area, which also improves the gripping strength and the gripping feeling when gripping, so as to reduce the chances that the pet tractor is out of the hand when the user grips the pet tractor, thereby improving the user experience.

Embodiment 3

The Embodiment of the present disclosure further provides a pet traction device 100 including the pet tractor in Embodiment 1 or Embodiment 2. The pet traction device 100 further includes a pet back armor, and the pet tractor is connected to the pet back armor by the tractor rope; or the pet traction device 100 further includes a pet collar, and the pet tractor is connected to the pet collar by the tractor rope. The pet traction device 100 includes all beneficial effects of the pet tractor, which is not described in detail herein.

In all of the embodiments shown and described herein, any specific values should be interpreted as merely exemplary and not as limitations. Therefore, other examples of exemplary embodiments may have different values.

The above embodiments only illustrate several embodiments of the present disclosure, which is described in a more specific and detailed manner, but is not to be understood as limitations of the scope of the present disclosure as a result. It should be noted that for a person of ordinary skill in the art, several deformations and improvements can be made without departing from the conception of the present disclosure, all of which fall within the scope of protection of the present disclosure.

What is claimed is:

1. A pet tractor, comprising a housing, wherein the housing defines a mounting cavity, and the mounting cavity is provided therein with a first rotation shaft;

a rope winding assembly, wherein the rope winding assembly comprises at least one movable member, a rope winding member, and a tractor rope winding on the rope winding member, wherein the rope winding member is rotationally connected to the first rotation shaft, and one end of the movable member is movably connected to the rope winding member;

a locking assembly, wherein the locking assembly is connected to the housing, and one end of the locking assembly is movably connected to the rope winding member; and a blocking assembly, wherein the blocking assembly can abut against or separate from one end of the movable member away from the rope winding member;

wherein the movable member comprises an anti-rushing plate and a first returning member, wherein one end of the anti-rushing plate is movably connected to the rope winding member by a second rotation shaft; and the first returning member is sleeved on the second rotation shaft and one side of the first returning member is connected to the anti-rushing plate, wherein one side of the first returning member away from the anti-rushing plate is connected to the rope winding member, and one end of the anti-rushing plate away from the second rotation shaft abuts against or separates from the blocking assembly.

2. The pet tractor according to claim 1, wherein the rope winding member is a rope winding disc of an annular structure; two movable members are located on an inner periphery of the rope winding disc; and two movable members are provided, wherein the blocking assembly is sleeved on the first rotation shaft, and blocking parts are arranged on opposite two ends of the blocking assembly, wherein each movable member abuts against or separates from one of the blocking parts.

3. The pet tractor according to claim 2, wherein the two movable members are symmetrically arranged, and the first rotation shaft is on a line connecting the two movable members.

4. The pet tractor according to claim 1, wherein the rope winding member is a rope winding disc of an annular structure, wherein a plurality of movable members are provided, and the plurality of movable members are arranged around an inner periphery of the rope winding disc, wherein the blocking assembly comprises a plurality of blocking blocks, and the plurality of blocking blocks are all arranged on the housing, wherein each movable member abuts against or separates from one of the blocking blocks.

5. The pet tractor according to claim 1, wherein a plurality of position limitation parts are arranged around an outer periphery of the rope winding member, and one end of the locking assembly can abut against or separate from any one of the position limitation parts.

6. The pet tractor according to claim 1, wherein the housing is provided with a first opening, and one end of the tractor rope extends to an outside via the first opening.

7. The pet tractor according to claim 1, wherein a second opening is arranged on a position of the housing close to the locking assembly, and the second opening is communicated with the mounting cavity, wherein the locking assembly is located in the second opening, and the locking assembly is movably connected to the rope winding member.

8. A pet traction device, comprising the pet tractor according to claim 1.

* * * * *